United States Patent
Du

(10) Patent No.: US 12,386,885 B2
(45) Date of Patent: Aug. 12, 2025

(54) PICTURE SEARCH METHOD AND APPARATUS, ELECTRONIC DEVICE, COMPUTER-READABLE STORAGE MEDIUM

(71) Applicant: TENCENT TECHNOLOGY (SHENZHEN) COMPANY LIMITED, Guangdong (CN)

(72) Inventor: Wei Du, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 386 days.

(21) Appl. No.: 17/951,824

(22) Filed: Sep. 23, 2022

(65) Prior Publication Data
US 2023/0082638 A1 Mar. 16, 2023

Related U.S. Application Data

(63) Continuation of application No. PCT/CN2021/123256, filed on Oct. 12, 2021.

(30) Foreign Application Priority Data

Nov. 10, 2020 (CN) .......................... 202011248141.7

(51) Int. Cl.
*G06F 16/583* (2019.01)
*G06V 30/148* (2022.01)
(Continued)

(52) U.S. Cl.
CPC .......... *G06F 16/583* (2019.01); *G06V 30/158* (2022.01); *G06V 30/1918* (2022.01); *G06V 30/413* (2022.01)

(58) Field of Classification Search
CPC . G06F 16/583; G06F 16/5846; G06V 30/158; G06V 30/1918; G06V 30/413;
(Continued)

(56) References Cited

U.S. PATENT DOCUMENTS

| | | | | |
|---|---|---|---|---|
| 9,292,739 | B1* | 3/2016 | Gray | G06V 30/1918 |
| 2008/0063277 | A1* | 3/2008 | Vincent | G06F 18/254 |
| | | | | 382/182 |

(Continued)

FOREIGN PATENT DOCUMENTS

| | | |
|---|---|---|
| CN | 101464903 A | 6/2009 |
| CN | 101937438 A | 1/2011 |

(Continued)

OTHER PUBLICATIONS

International Search Report for PCT/CN2021/123256 dated Dec. 24, 2021 [PCT/ISA/210].

*Primary Examiner* — Amandeep Saini
*Assistant Examiner* — Andrew S Budisalich
(74) *Attorney, Agent, or Firm* — Banner & Witcoff, Ltd.

(57) ABSTRACT

A picture search method and apparatus, an electronic device, a computer-readable storage medium, and a computer program product, relating to the field of artificial intelligence that can obtain an OCR result of pictures in a preset picture library in response to a picture search request; traverse pictures which are not subjected to low-dimensional OCR processing and high-dimensional OCR processing in the preset picture library, and perform the low-dimensional OCR processing based on an OCR threshold on each of the traversed pictures to obtain a low-dimensional OCR result of each corresponding picture; determining a target picture matching a key character string in the preset picture library according to at least one of the low-dimensional OCR result and the high-dimensional OCR result of each picture; and determining the target picture as a search result of the picture search request, and displaying the search result.

18 Claims, 16 Drawing Sheets

(51) Int. Cl.
*G06V 30/19* (2022.01)
*G06V 30/413* (2022.01)

(58) Field of Classification Search
CPC ........ G06V 10/26; G06V 10/50; G06V 30/10; G06V 30/418
See application file for complete search history.

(56) References Cited

U.S. PATENT DOCUMENTS

| | | | |
|---|---|---|---|
| 2008/0082426 A1* | 4/2008 | Gokturk | G06F 16/5838 707/E17.014 |
| 2009/0169131 A1* | 7/2009 | Nestares | G06V 30/2504 382/292 |
| 2009/0189920 A1* | 7/2009 | Chiu | G09G 5/14 345/662 |
| 2019/0096040 A1* | 3/2019 | Sakabe | G06T 5/77 |
| 2021/0026883 A1* | 1/2021 | Xu | G06F 16/532 |
| 2021/0124919 A1* | 4/2021 | Balakrishnan | B42D 25/309 |
| 2023/0124402 A1* | 4/2023 | Song | G06F 40/237 704/9 |

FOREIGN PATENT DOCUMENTS

| | | | |
|---|---|---|---|
| CN | 109033261 A | * | 12/2018 |
| CN | 112347948 A | | 2/2021 |

\* cited by examiner

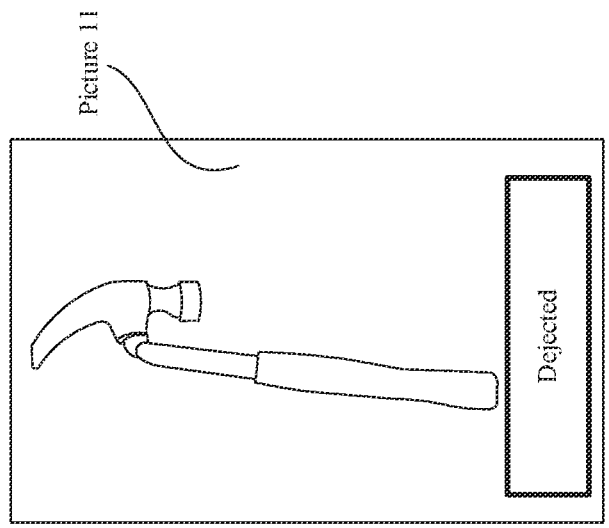

FIG. 14A

BRAVO CRAFT
BEER SELECTION

Craft Beer Daily List

Daytime Singing Pale...

White Knight...Wheat

Tear Resistant Lychee Sociality
The most distinctive fruit-lychee with the added flavor and irresistible aroma. The light wine body is infused with a light lychee flavor, and the refreshing wine body is mixed with the aftertaste of lychee Picture area 141

FIG. 14B

Picture area 142

Tear Resistant Lychee Sociality

The most distinctive fruit-lychee with the added flavor and irresistible aroma. The light wine body is infused with a light lychee flavor, and the refreshing wine body is mixed with the aftertaste of lychee After segmentation, it is more targeted and easy to recognize Beer Tasting Flight
Craft Beer Tasting Set
**************************************
**************************************

PICTURE SEARCH METHOD AND APPARATUS, ELECTRONIC DEVICE, COMPUTER-READABLE STORAGE MEDIUM

RELATED APPLICATION

The disclosure is a continuation application of International Application No.: PCT/CN2021/123256, filed Oct. 12, 2021, which claims priority to Chinese Patent Application No. 202011248141.7, entitled PICTURE SEARCH METHOD AND APPARATUS, ELECTRONIC DEVICE, COMPUTER-READABLE STORAGE MEDIUM, AND COMPUTER PROGRAM PRODUCT, filed on Nov. 10, 2020, which are incorporated herein by reference in their entireties.

FIELD

The disclosure relates to the field of internet technology, and relates to, but is not limited to, a picture search method and apparatus, an electronic device, a computer-readable storage medium, and a computer program product.

BACKGROUND

Picture search based on optical character recognition (OCR) relies on OCR to recognize texts in pictures and then search. If there are a large number of pictures, a user may need to wait for complete OCR to obtain search results, so the time cost is relatively high, resulting in lower efficiency of picture search.

SUMMARY

The embodiments of the disclosure provide a picture search method and apparatus, an electronic device, a computer-readable storage medium, and a computer program product, which relate to the technical field of artificial intelligence and can improve picture search efficiency.

Technical solutions in the embodiments of the disclosure are implemented as follows:

An embodiment of the disclosure provides a picture search method, including:
 obtaining a picture search request, the picture search request including a key character string:
 obtaining an OCR result of each picture in a preset picture library in response to the picture search request, the OCR result including at least one of the following: a low-dimensional OCR result obtained by low-dimensional OCR processing based on an OCR threshold and a high-dimensional OCR result obtained by high-dimensional OCR processing based on depth recognition, and the recognition accuracy of the low-dimensional OCR processing being lower than the recognition accuracy of the high-dimensional OCR processing;
 traversing pictures which are not subjected to the low-dimensional OCR processing and the high-dimensional OCR processing in the preset picture library, and performing the low-dimensional OCR processing on each of the traversed pictures to obtain a low-dimensional OCR result of each corresponding picture:
 determining a target picture matching the key character string in the preset picture library according to at least one of the low-dimensional OCR result and the high-dimensional OCR result of each picture; and
 determining the target picture as a search result of the picture search request, and displaying the search result.

An embodiment of the disclosure provides a picture search apparatus, including:
 an obtaining module configured to obtain a picture search request, the picture search request including a key character string:
 a response module configured to obtain an OCR result of each picture in a preset picture library in response to the picture search request, the OCR result including at least one of the following: a low-dimensional OCR result obtained by low-dimensional OCR processing based on an OCR threshold and a high-dimensional OCR result obtained by high-dimensional OCR processing based on depth recognition, and the recognition accuracy of the low-dimensional OCR processing being lower than the recognition accuracy of the high-dimensional OCR processing:
 a processing module configured to traverse pictures which are not subjected to the low-dimensional OCR processing and the high-dimensional OCR processing in the preset picture library, and perform the low-dimensional OCR processing on each of the traversed pictures to obtain a low-dimensional OCR result of each corresponding picture:
 a first determining module configured to determine a target picture matching the key character string in the preset picture library according to at least one of the low-dimensional OCR result and the high-dimensional OCR result of each picture, and
 a second determining module configured to determine the target picture as a search result of the picture search request, and display the search result.

An embodiment of the disclosure provides a computer program product, including computer programs or instructions. The computer programs or instructions, when executed by a processor, implement the picture search method provided by the embodiments of the disclosure.

An embodiment of the disclosure provides a picture search device, including:
 a memory, configured to store executable instructions; and a processor, configured to implement the picture search method provided in the embodiments of the disclosure when executing the executable instructions stored in the memory.

An embodiment of the disclosure provides a non-transitory computer-readable storage medium, storing executable instructions, and being configured to implement, when a processor executes the executable instructions, the picture search method provided by the embodiments of the disclosure.

The embodiments of the disclosure have the following beneficial effects: since some pictures in the preset picture library already include the corresponding OCR results, when pictures are searched in the preset picture library, only the remaining pictures in the preset picture library except for some pictures including the OCR results are subjected to low-dimensional OCR processing, so as to obtain OCR results of all pictures in the preset picture library, therefore, the obtaining speed of the OCR results is higher. As a result, when pictures are searched in the preset picture library based on the OCR results of all pictures in the preset picture library, the picture search efficiency may be improved.

BRIEF DESCRIPTION OF THE DRAWINGS

FIG. 1A is a schematic diagram of a picture search process according to an example embodiment of the disclosure.

FIG. 14A is a schematic diagram before equally dividing and magnifying a picture according to an example embodiment of the disclosure.

FIG. 14B is a schematic diagram after equally dividing and magnifying a picture according to an example embodiment of the disclosure.

DESCRIPTION OF EMBODIMENTS

To make the objectives, technical solutions, and advantages of the disclosure clearer, the following describes the disclosure in further detail with reference to the accompanying drawings. The described embodiments are not to be considered as a limitation to the disclosure. All other embodiments obtained by a person of ordinary skill in the art without creative efforts shall fall within the protection scope of the disclosure.

In the following descriptions, related "some embodiments" describe a subset of all possible embodiments. However, it may be understood that the "some embodiments" may be the same subset or different subsets of all the possible embodiments, and may be combined with each other without conflict. Unless otherwise defined, meanings of all technical and scientific terms used in the embodiments of the disclosure are the same as those usually understood by a person skilled in the art to which the embodiments of the disclosure belong. Terms used in the embodiments of the disclosure are merely intended to describe objectives of the embodiments of the disclosure, but are not intended to limit the disclosure.

In order to better understand the picture search method provided by the embodiments of the disclosure, the picture search method is described first.

When searching for pictures (for example, searching for emoticon pictures), a user may search by some keywords on the pictures. FIG. 1A is a schematic diagram of a picture search process. When the user wants to search for an emoticon picture corresponding to "dejected", the user may input "dejected", and then, a system will automatically match and output a picture 11.

Figure 1B:
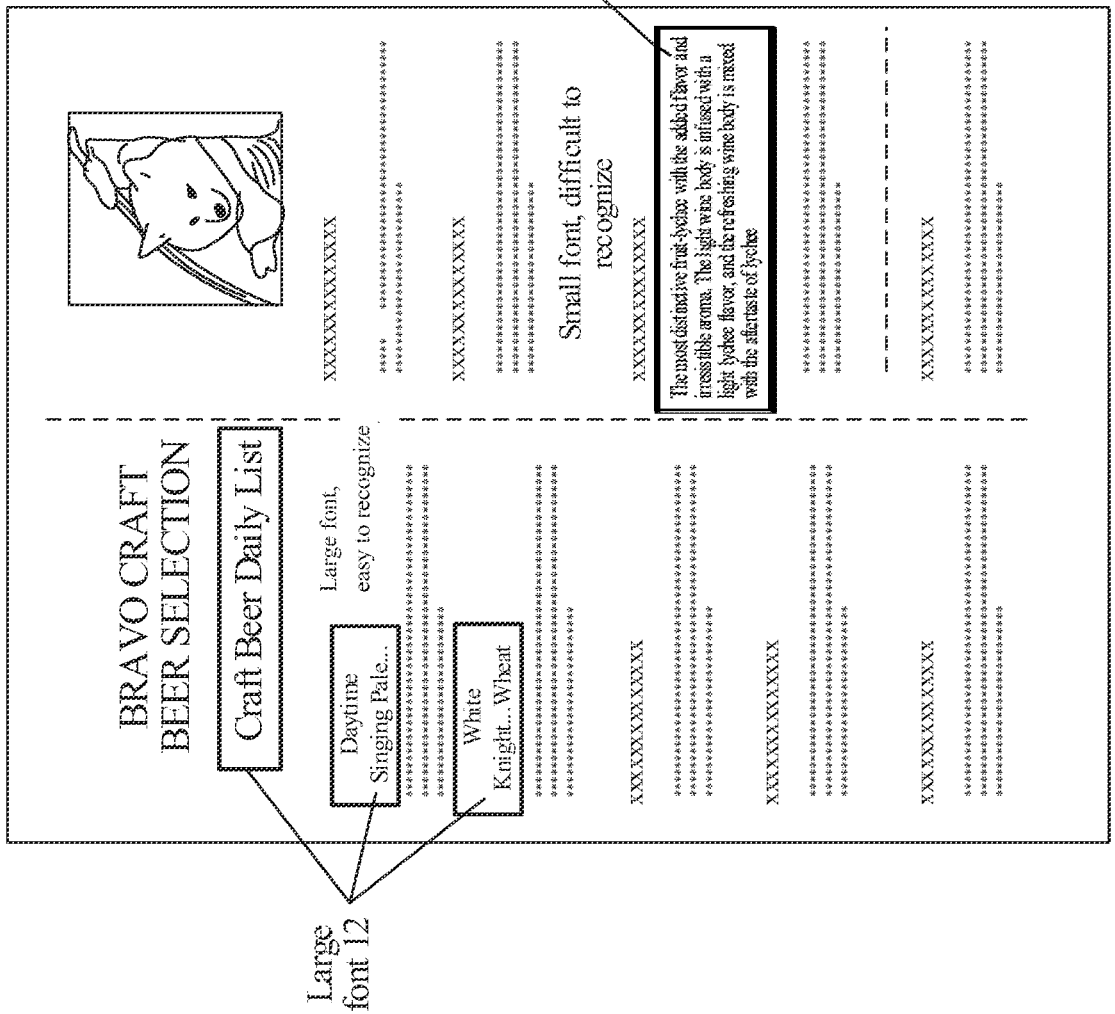
FIG. 1B is a schematic diagram of a search scene in which a picture to be searched is a note according to an example embodiment of the disclosure.

However, when the user wants to search for the detailed text information captured in some pictures, a common search method cannot support such fine recognition. For example, when the user wants to search for text information in a note, as shown in FIG. 1B which is a schematic diagram of a search scene in which a picture to be searched is a note, the existing search function cannot support this kind of search. During searching, the threshold of OCR is relatively low, and the contents which are easier to be recognized, such as a large font 12, will be recognized preferentially, which can ensure that the time consumed by recognition during search will not be too long. The user cannot search for detailed text information, such as text information 13, by the search function. Therefore, it is necessary to optimize the search function in this case. In other words, if the user needs to search for more detailed text information in the picture, such as the note information and store name in the picture, the original search function cannot provide such fine search.

In addition, in some solutions, pictures are first uploaded to a server for OCR, and after the recognition is completed, results are synchronized to a client. Such solutions have relatively high accuracy, but the requests of the server for uploading, downloading, etc. will have a certain risk of failure. The uploading of large pictures and long pictures will consume more time and traffic, and the privacy of user pictures is also difficult to be guaranteed.

In conclusion, there are at least the following problems in the picture search process: high-accuracy recognition takes too much time and thus cannot be applicable to search scenes; low-accuracy recognition makes it impossible to find detailed contents during search; and cloud recognition will face the risk of failure to upload and download, time-consuming uploading and downloading, the risk of privacy leakage, and offline unavailability.

In order to solve at least one of the above problems existing in the picture search method, the example embodiments of the disclosure provide a picture search method which combines fast recognition with accurate recognition for secondary processing of pictures, and optimizes the efficiency and accuracy of OCR for recognizing text information on pictures during the search process, so that recognition results are faster and more accurate.

The picture search method provided by the example embodiments of the disclosure include: first, obtain a picture search request, the picture search request including a key character string; then, obtain an OCR result of each picture in a preset picture library in response to the picture search request, the OCR result including at least one of the following: a low-dimensional OCR result obtained by low-dimensional OCR processing based on an OCR threshold and a high-dimensional OCR result obtained by high-dimensional OCR processing based on depth recognition, and the recognition accuracy of the low-dimensional OCR processing being lower than the recognition accuracy of the high-dimensional OCR processing; then, traverse pictures which are not subjected to the low-dimensional OCR processing and the high-dimensional OCR processing in the preset picture library, and perform the low-dimensional OCR processing on each of the traversed pictures to obtain a low-dimensional OCR result of each corresponding picture; determine a target picture matching the key character string in the preset picture library according to at least one of the low-dimensional OCR result and the high-dimensional OCR result of each picture, and finally, determine the target picture as a search result of the picture search request, and display the search result. In this way, since the recognition results of the low-dimensional OCR processing and the high-dimensional OCR processing are combined for picture search, the text information in pictures may be searched more accurately, fine search may be realized, accurate search results may be obtained, and the search efficiency may be improved.

The following describes exemplary applications of an electronic device for picture search provided by the example embodiments of the disclosure. In one implementation, an electronic device for picture search provided by the embodiments of the disclosure may be implemented as any terminal such as a notebook computer, a tablet computer, a desktop computer, a mobile device (such as a mobile phone, a portable music player, a personal digital assistant, a dedicated message device, and a portable game device), and an intelligent robot. In another implementation, an electronic device for picture search provided by the embodiments of the disclosure may further be implemented as a server. The following describes exemplary applications of an electronic device for picture search implemented as a terminal, and a client on the terminal may be used for picture search.

Figure 2:
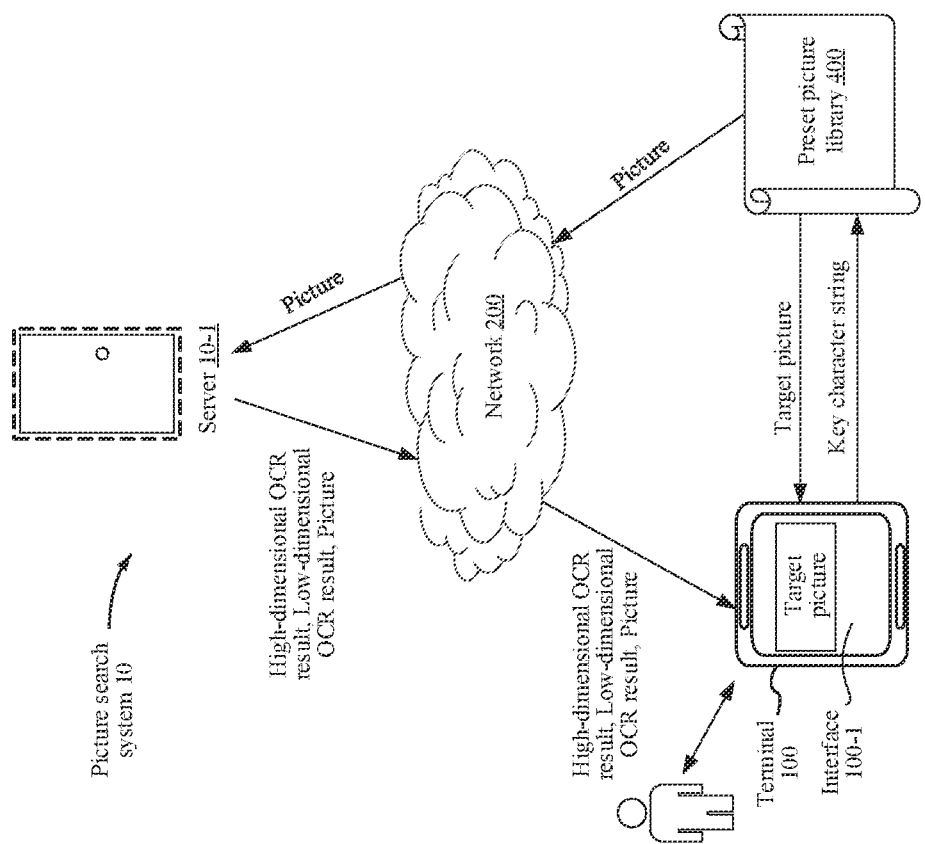
FIG. 2 is an optional schematic architectural diagram of a picture search system according to an example embodiment of the disclosure.

FIG. 2 is an optional schematic architectural diagram of a picture search system provided by an example embodiment of the disclosure. In order to achieve an accurate response to a picture search request to search for an accurate target picture, a picture search system 10 provided by an example embodiment of the disclosure includes a terminal 100 (that is, an electronic device), a network 200 and a server 10-1, where a picture search application runs on the terminal 100, the picture search application corresponds to a preset picture library 400, and the preset picture library 400 stores a plurality of pictures. A user may input a key character string by a client of the picture search application running on the terminal 100 to form a picture search request, and the client responds to the picture search request of the user to match the target picture in the preset picture library, where the target picture includes at least one picture. In this example embodiment of the disclosure, the client may further perform low-dimensional OCR processing based on an OCR threshold on each picture in the preset picture library 400. The server 10-1 as a background server is configured to perform high-dimensional OCR processing based on depth recognition on each picture in the preset picture library 400 during an idle time to obtain a high-dimensional OCR result, and send the high-dimensional OCR result to the terminal 100, where the idle time refers to an idle time of the terminal, which is a time period when each running index (CPU occupancy rate, memory occupancy rate, graphics card occupancy rate, etc.) in the terminal is lower than the threshold, for example, late at night, during charging, when each functional application is not in use, etc.

In this example embodiment of the disclosure, when the picture search request is obtained, the terminal 100 obtains the OCR result of each picture in the preset picture library from the server 10-1 by the network 200 in response to the picture search request, where the OCR result includes at least one of the following: a low-dimensional OCR result obtained by low-dimensional OCR processing based on an OCR threshold and a high-dimensional OCR result obtained by high-dimensional OCR processing based on depth recognition; the pictures which are subjected to the low-dimensional OCR processing and the high-dimensional OCR processing in the preset picture library are obtained from the server 10-1 by the network 200, the pictures which are not subjected to the low-dimensional OCR processing and the high-dimensional OCR processing in the preset picture library are traversed, and the low-dimensional OCR processing is performed on each of the traversed pictures to obtain a low-dimensional OCR result of each corresponding picture; a target picture matching the key character string is determined in the preset picture library according to at least one of the low-dimensional OCR result and the high-dimensional OCR result of each picture; and the target picture is determined as a search result of the picture search request, and the search result is displayed on a current interface 100-1 of the terminal 100.

The picture search method provided by the example embodiments of the disclosure relates to the technical field of artificial intelligence, and may be implemented at least by the computer vision technology and the machine learning technology in the artificial intelligence technology. The CV technology is a science that studies how to use a machine to "see", and is machine vision that a camera and a computer are used for replacing human eyes to perform recognition, tracking, measurement, and the like on a target, and further perform graphic processing, so that the computer processes the target into an image more suitable for human eyes to observe, or an image transmitted to an instrument for detection. As a scientific discipline, CV studies related theories and technologies and attempts to establish an AI system that can obtain information from images or multi-dimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

Machine learning (ML) is a multi-field interdisciplinary subject involving the probability theory, statistics, the approximation theory, convex analysis, the algorithm complexity theory, and the like. The ML specializes in studying how a computer simulates or implements a human learning behavior to obtain new knowledge or skills, and reorganize an existing knowledge structure, so as to keep improving performance of the computer. The ML, as the core of AI, is a basic way to make the computer intelligent, and is applicable to various fields of AI. The ML and DL generally include technologies such as an artificial neural network, a belief network, reinforcement learning, transfer learning, inductive learning, and learning from demonstrations. In this example embodiment of the disclosure, the OCR of pictures is implemented by the machine learning technology.

Figure 3:
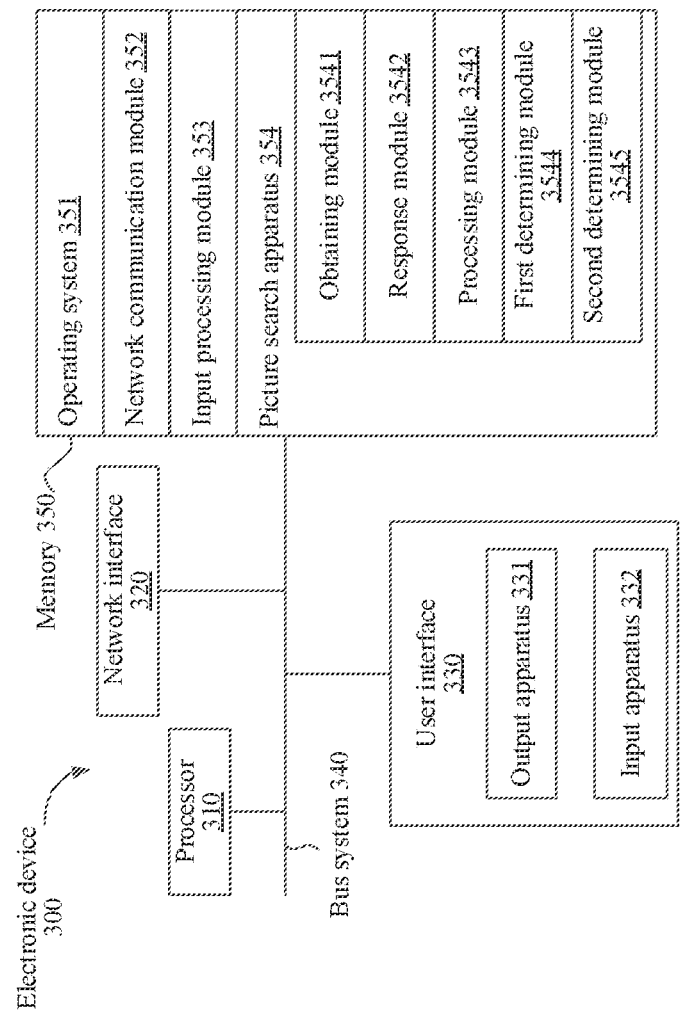
FIG. 3 is a schematic structural diagram of an electronic device according to an example embodiment of the disclosure.

FIG. 3 is a schematic structural diagram of an electronic device 300 provided by an example embodiment of the disclosure. The electronic device 300 shown in FIG. 3 includes: at least one processor 310, a memory 350, at least one network interface 320, and a user interface 330. All the components in the electronic device 300 are coupled together by using a bus system 340. It may be understood that, the bus system 340 is configured to implement connection and communication between the components. In addition to a data bus, the bus system 340 further includes a power bus, a control bus, and a state signal bus. However, for ease of clear description, all types of buses are marked as the bus system 340 in FIG. 3.

The processor 310 may be an integrated circuit chip having a signal processing capability, for example, a general purpose processor, a DSP, or another PLD, discrete gate, transistor logical device, or discrete hardware component. The general purpose processor may be a microprocessor, any conventional processor, or the like.

The user interface 330 includes one or more output apparatuses 331 that can display media content, including one or more loudspeakers and/or one or more visual display screens. The user interface 330 further includes one or more input apparatuses 332, including user interface components that facilitate inputting of a user, such as a keyboard, a mouse, a microphone, a touch display screen, a camera, and other input button and control.

The memory 350 may be a removable memory, a non-removable memory, or a combination thereof. Exemplary hardware devices include a solid-state memory, a hard disk driver, an optical disc driver, or the like. The memory 350 optionally includes one or more storage devices away from the processor 310 in a physical position. The memory 350 includes a volatile memory or a non-volatile memory, or may include both a volatile memory and a non-volatile memory. The non-volatile memory may be a read-only memory (ROM). The volatile memory may be a random access memory (RAM). The memory 350 described in this example embodiment of the disclosure aims to include any suitable type of memories. In some example embodiments, the memory 350 may store data to support various operations. Examples of the data include a program, a module, and a data structure, or a subset or a superset thereof, which are described below by using examples.

An operating system 351 includes a system program configured to process various basic system services and perform a hardware-related task, such as a framework layer, a core library layer, or a driver layer, and is configured to implement various basic services and process a hardware-based task.

A network communication module 352 is configured to reach another computing device through one or more (wired or wireless) network interfaces 320. Exemplary network interfaces 320 include: Bluetooth, wireless compatible authentication (Wi-Fi), a universal serial bus (USB), and the like.

An input processing module 353 is configured to detect one or more user inputs or interactions from one of the one or more input apparatuses 332 and translate the detected input or interaction.

In some example embodiments, a picture search apparatus provided by the example embodiments of the disclosure may be implemented by using software. FIG. 3 shows a picture search apparatus 354 stored in the memory 350. The picture search apparatus 354 may be a picture search apparatus in the electronic device 300, which may be software in a form such as a program and a plug-in, and includes the following software modules: an obtaining module 3541, a response module 3542, a processing module 3543, a first determining module 3544, and a second determining module 3545. These modules are logical modules, and thus may be combined differently or further divided according to implemented functions. The following describes functions of the modules.

In some other example embodiments, the picture search apparatus provided in this example embodiment of the disclosure may be implemented by using hardware. For example, the picture search apparatus provided in this example embodiment of the disclosure may be a processor in a form of a hardware decoding processor, programmed to perform the picture search method provided in the example embodiments of the disclosure. For example, the processor in the form of a hardware decoding processor may use one or more application-specific integrated circuits (ASIC), a DSP, a programmable logic device (PLD), a complex programmable logic device (CPLD), a field-programmable gate array (FPGA), or other electronic components.

Figure 4:
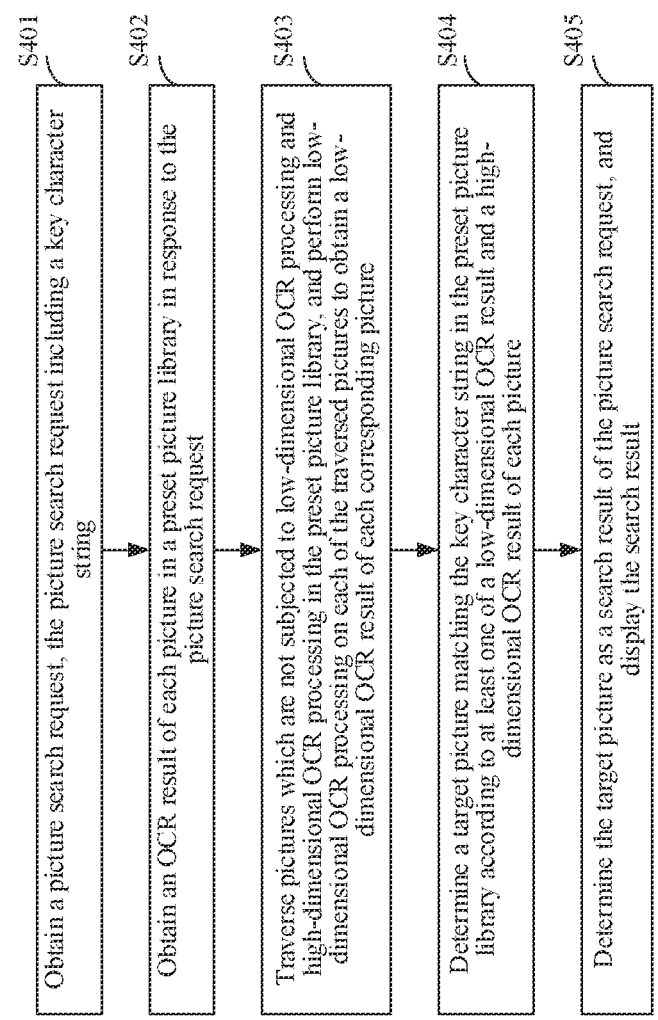
FIG. 4 is an optional schematic flowchart I of a picture search method according to an example embodiment of the disclosure.

The picture search method provided in the example embodiments of the disclosure is described below with reference to an exemplary application and implementation of an electronic device 300 provided in this example embodiment of the disclosure. Referring to FIG. 4, FIG. 4 is an optional schematic flowchart I of a picture search method provided by an example embodiment of the disclosure, and operations shown in FIG. 4 are combined for description.

S401: Obtain a picture search request, the picture search request including a key character string.

Here, a picture search application runs on an electronic device, a user can input a key character string on a client of the picture search application, and then, the client forms a picture search request based on the input operation of the user or the operation of the user for tapping search, so as to request the client to search for a picture corresponding to the key character string. The key character string may be types of pictures, texts in pictures, summaries of texts in pictures, etc.

In this example embodiment of the disclosure, when performing picture search in response to the picture search request, the client can search in an online state or in an offline state.

S402: Obtain an OCR result of each picture in a preset picture library in response to the picture search request.

Here, the OCR result includes at least one of the following: a low-dimensional OCR result obtained by low-dimensional OCR processing based on an OCR threshold and a high-dimensional OCR result obtained by high-dimensional OCR processing based on depth recognition, where the low-dimensional OCR processing is a simplified recognition strategy, and the high-dimensional OCR processing is a depth recognition strategy; the low-dimensional OCR processing performs simple recognition of the picture, the high-dimensional OCR processing performs more detailed and accurate recognition of the picture, and the recognition accuracy of the low-dimensional OCR processing is lower than the recognition accuracy of the high-dimensional OCR processing; and the low-dimensional OCR processing has lower difficulty, lower recognition accuracy, higher recognition rate and lower resource loss, and the high-dimensional OCR processing has higher difficulty, higher recognition accuracy, lower recognition rate and higher resource loss.

The OCR threshold is a relatively balanced value between the recognition accuracy and the recognition time. In other words, when the OCR threshold is met, the recognition speed is high, and the recognition error tolerance rate is higher. For example, the OCR threshold may include a threshold corresponding to a font size or a threshold corresponding to a recognition confidence. That is, during recognition of texts with a certain font size, the recognition accuracy may be ensured, and the recognition efficiency can also be ensured, in this way, a font size value corresponding to the font size may be the OCR threshold; or during recognition of texts in a picture, when a certain confidence is reached, the recognition accuracy is higher, and the recognition efficiency is also higher, in this way, the confidence may be determined as the OCR threshold.

In this example embodiment of the disclosure, the low-dimensional OCR processing is performed based on the OCR threshold. In other words, when the low-dimensional OCR processing is performed on the picture, a recognition parameter meets the OCR threshold. For example, if the OCR threshold includes a font size threshold, during low-dimensional OCR processing, only the texts of which the font size is greater than the font size threshold in the picture are recognized, and the texts of which the font size is smaller than the font size threshold are not recognized. That is, during low-dimensional OCR processing on the picture, if the picture is a picture with more detailed texts, such as a note, the OCR will not be performed on all texts in the picture, and the OCR is only performed on some texts which are easily recognized in the picture, so that the recognition efficiency may be improved.

The depth recognition refers to an accurate recognition mode that further recognizes the detailed contents in the picture. During the depth recognition, the overall contents are recognized, and the detailed texts in the picture are further recognized. The high-dimensional OCR processing based on the depth recognition can recognize each text in the picture, therefore, the high-dimensional OCR processing has higher recognition accuracy and is more time-consuming.

In some example embodiments, after low-dimensional OCR processing is performed on a picture, a low-dimensional OCR result is obtained; after high-dimensional OCR processing is performed on the picture, a high-dimensional OCR result is obtained; and after the low-dimensional OCR result or the high-dimensional OCR result is obtained, the corresponding low-dimensional OCR result or high-dimensional OCR result, a mapping relationship between the low-dimensional OCR result and the picture, and a mapping relationship between the high-dimensional OCR result and the picture are stored in a preset storage unit. In this way, an electronic device can obtain OCR results of some pictures in a preset picture library from the preset storage unit.

S403: Traverse pictures which are not subjected to the low-dimensional OCR processing and the high-dimensional OCR processing in the preset picture library, and perform the low-dimensional OCR processing on each of the traversed pictures to obtain a low-dimensional OCR result of each corresponding picture.

Here, an electronic device judges each picture in the preset picture library to determine whether each picture is subjected to the low-dimensional OCR processing and the high-dimensional OCR processing, and traverses the pictures which are not subjected to the low-dimensional OCR processing and the high-dimensional OCR processing in the preset picture library. For example, an electronic device can determine whether each picture is subjected to the low-dimensional OCR processing or the high-dimensional OCR processing by finding whether the low-dimensional OCR result or the high-dimensional OCR result of each picture is stored in the preset storage unit.

In this example embodiment of the disclosure, the pictures which are still not subjected to the low-dimensional OCR processing and the high-dimensional OCR processing at the current moment are subjected to the low-dimensional OCR processing. Since the recognition efficiency of the low-dimensional OCR processing is higher, in this picture search process, the picture recognition efficiency may be improved, so as to improve the picture search efficiency.

After the low-dimensional OCR processing is performed on any picture at the current moment, the low-dimensional OCR result of the picture may be correspondingly stored in the preset storage unit.

S404: Determine a target picture matching the key character string in the preset picture library according to at least one of the low-dimensional OCR result and the high-dimensional OCR result of each picture.

In this example embodiment of the disclosure, during matching of the target picture, an electronic device may perform matching based on the low-dimensional OCR result of the picture, and may further perform matching based on the high-dimensional OCR result of the picture. If the picture has a high-dimensional OCR result, the matching is performed preferentially based on the high-dimensional OCR result, because the high-dimensional OCR result has more recognized contents and higher recognition accuracy than the low-dimensional OCR result. If the picture only has a low-dimensional OCR result, the matching is performed based on the low-dimensional OCR result. In addition, the matching may further be performed based on the low-dimensional OCR result and the high-dimensional OCR result.

In some example embodiments, during matching of a target picture, a key character string may be matched with the text content corresponding to a low-dimensional OCR result or a high-dimensional OCR result, the similarity between the text content corresponding to the low-dimensional OCR result or the high-dimensional OCR result and the key character string is determined, and a picture with the highest similarity is determined as the target picture; or after the similarity between each picture and the key character string is determined, the pictures are sorted in a descending order of the similarity to form a picture sequence, and then, a certain number of pictures in the picture sequence are selected as target pictures.

In some example embodiments, during matching of a target picture, a picture key character string corresponding to each picture may be determined first according to the text content corresponding to a low-dimensional OCR result or a high-dimensional OCR result, then the key character string in a picture search request is matched with the picture key character string of each picture, and a picture corresponding to the picture key character string which is the same as or similar to the key character string in the picture search request is determined as the target picture.

It may be understood that at least one of high-dimensional OCR results and low-dimensional OCR results of some pictures in the preset picture library are pre-stored, so that during recognition, some pictures may be searched by the high-dimensional OCR results, and the remaining pictures may be searched by the low-dimensional OCR results. The low-dimensional OCR result may be pre-stored or obtained in real time. Due to the high obtaining speed of the low-dimensional OCR result, both the picture search efficiency and the picture search speed may be ensured.

S405: Determine the target picture as a search result of the picture search request, and display the search result.

In this example embodiment of the disclosure, if one target picture is determined, the picture is displayed on the current interface of an electronic device. If multiple target pictures are determined, the multiple pictures are displayed on the current interface of an electronic device at the same time, or the multiple pictures are displayed in pages.

According to the picture search method provided by the example embodiments of the disclosure, the pictures in the preset picture library are processed by the low-dimensional OCR processing based on an OCR threshold and the high-dimensional OCR processing based on depth recognition to correspondingly obtain low-dimensional OCR results and high-dimensional OCR results, and the target picture of the picture search request is matched according to the low-dimensional OCR result or the high-dimensional OCR result of each picture. In this way, since the recognition results of the low-dimensional OCR processing and the high-dimensional OCR processing are combined for picture search, the text information in pictures may be searched more accurately, fine search may be realized, accurate search results may be obtained, and the search efficiency may be improved.

Figure 5:
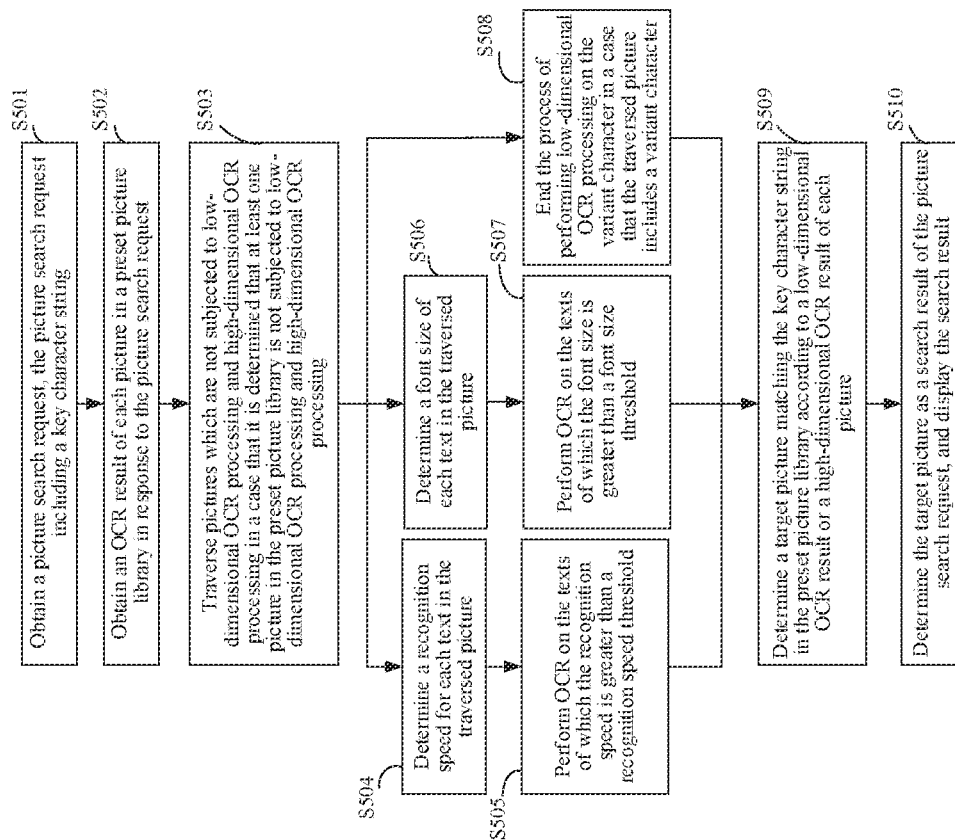
FIG. 5 is an optional schematic flowchart II of a picture search method according to an example embodiment of the disclosure.

In some example embodiments, low-dimensional OCR processing may be performed in different ways. FIG. 5 is an optional schematic flowchart II of a picture search method provided by an example embodiment of the disclosure, and operations shown in FIG. 5 are combined for description.

S501: Obtain a picture search request, the picture search request including a key character string.

S502: Obtain an OCR result of each picture in a preset picture library in response to the picture search request.

The OCR result includes at least one of the following: a low-dimensional OCR result obtained by low-dimensional OCR processing based on an OCR threshold and a high-dimensional OCR result obtained by high-dimensional OCR processing based on depth recognition, and the recognition accuracy of the low-dimensional OCR processing is lower than the recognition accuracy of the high-dimensional OCR processing.

S503: Traverse pictures which are not subjected to the low-dimensional OCR processing and the high-dimensional OCR processing in a case that it is determined that at least one picture in the preset picture library is not subjected to the low-dimensional OCR processing and the high-dimensional OCR processing.

It is to be understood that the descriptions of the implementation processes of S501 to S503 are the same as the descriptions of the implementation processes to S401 to S403.

In some example embodiments, an OCR threshold includes a recognition speed threshold. Correspondingly, low-dimensional OCR processing may be performed by the following operations:

S504: Determine a recognition speed for each text in the traversed picture.

Here, the recognition speed of each text refers to a ratio of the time required for recognizing a certain text to the number of characters of the text to be recognized. The higher the recognition speed, the lower the recognition difficulty of the corresponding text and the easier it is to recognize. The lower the recognition speed, the higher the recognition difficulty of the corresponding text, and the more difficult it is to recognize.

In this example embodiment of the disclosure, an electronic device can determine the recognition speed for each type of text in advance according to the OCR situation, so as to determine an appropriate recognition speed threshold.

S505: Perform OCR on the texts of which the recognition speed is greater than the recognition speed threshold.

Here, the text of which the recognition speed is greater than the recognition speed threshold is relatively easy to recognize, and an electronic device can only perform OCR on the text which is relatively easy to recognize, so as to complete the low-dimensional OCR processing of the picture.

In some example embodiments, an OCR threshold includes a font size threshold. Correspondingly, low-dimensional OCR processing may be performed by the following operations:

S506: Determine a font size of each text in the traversed picture.

Here, texts with larger font sizes are relatively easy to recognize, so the recognition speed is higher; and texts with smaller font sizes are relatively more difficult to recognize, so the recognition speed is lower.

In this example embodiment of the disclosure, an electronic device can determine the recognition speed of texts with different font sizes in advance according to the OCR situation, so as to determine an appropriate font size threshold.

S507: Perform OCR on the texts of which the font size is greater than the font size threshold.

In some example embodiments, a picture may further include a variant character. Correspondingly, low-dimensional OCR processing may be performed by the following operations:

S508: End the process of performing low-dimensional OCR processing on the variant character in a case that the traversed picture includes a variant character.

Here, since an electronic device cannot accurately recognize the variant character, the variant character is not recognized.

S509: Determine a target picture matching the key character string in the preset picture library according to the low-dimensional OCR result or the high-dimensional OCR result of each picture.

S510: Determine the target picture as a search result of the picture search request, and display the search result.

In this example embodiment of the disclosure, w % ben low-dimensional OCR processing is performed on a picture, different OCR thresholds may be set, and the different OCR thresholds may be used as reference conditions for recognition to perform text recognition. As a result, the recognition speed may be increased while ensuring the recognition accuracy, and the balance between the recognition accuracy and the recognition efficiency may be achieved.

Figure 6:
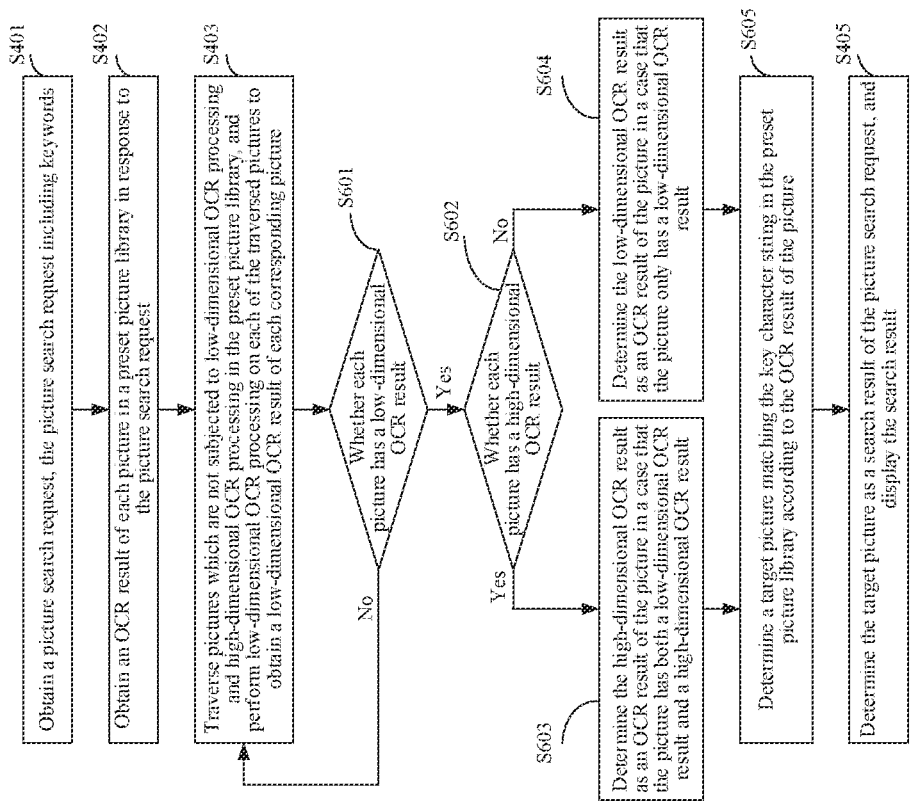
FIG. 6 is an optional schematic flowchart III of a picture search method according to an example embodiment of the disclosure.

Based on FIG. 4, FIG. 6 is an optional schematic flowchart III of a picture search method provided by an example embodiment of the disclosure. In some example embodiments, the recognition accuracy of low-dimensional OCR processing is lower than the recognition accuracy of high-dimensional OCR processing. As shown in FIG. 6, S404 may be implemented by the following operations:

S601: Judge whether each picture has a low-dimensional OCR result.

If a judging result is yes, S602 is performed; and if a judging result is no, S403 is performed to continue to perform low-dimensional OCR processing on the picture.

S602: Judge whether each picture has a high-dimensional OCR result.

If a judging result is yes, S603 is performed; and if a judging result is no, S604 is performed.

S603: Determine the high-dimensional OCR result as an OCR result of the picture in a case that the picture has both a low-dimensional OCR result and a high-dimensional OCR result.

S604: Determine the low-dimensional OCR result as an OCR result of the picture in a case that the picture only has a low-dimensional OCR result.

S605: Determine a target picture matching the key character string in the preset picture library according to the OCR result of the picture.

In this example embodiment of the disclosure, since the accuracy of the high-dimensional OCR result is higher than the accuracy of the low-dimensional OCR result, if there are both a low-dimensional OCR result and a high-dimensional OCR result, the target picture is matched based on the high-dimensional OCR result with higher accuracy. Moreover, if there is only a low-dimensional OCR result, in order to ensure the timeliness of the picture search task and improve the search efficiency of the picture search task, the target picture is matched based on the low-dimensional OCR result. At this time, since the low-dimensional OCR result also has a certain confidence and recognition accuracy, the accuracy of a final matching result can further be ensured to a certain extent while ensuring the picture search efficiency.

Figure 7:
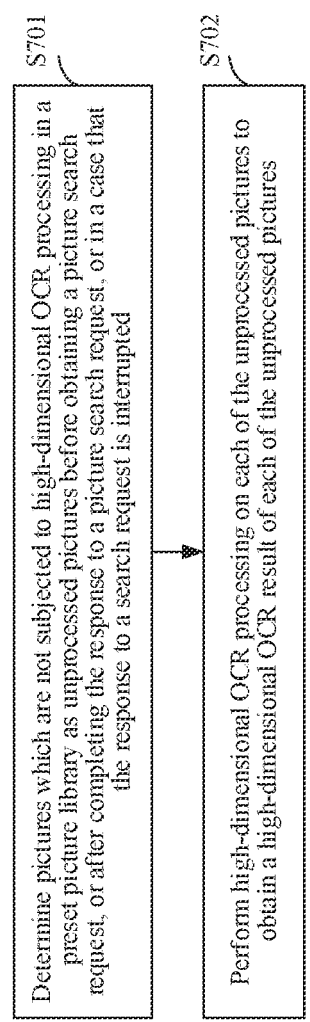
FIG. 7 is an optional schematic flowchart of high-dimensional OCR processing according to an example embodiment of the disclosure.

FIG. 7 is an optional schematic flowchart of high-dimensional OCR processing provided by an example embodiment of the disclosure, and operations shown in FIG. 7 are combined for description.

S701: Determine pictures which are not subjected to high-dimensional OCR processing in the preset picture library as unprocessed pictures before obtaining the picture search request, or after completing the response to the picture search request, or in a case that the response to the search request is interrupted.

In this example embodiment of the disclosure, high-dimensional OCR processing may be implemented during an idle time. In other words, if an electronic device does not perform a picture search task, the high-dimensional OCR processing may be performed in the background. Since the picture search task is not performed before obtaining the picture search request, or after completing the response to the picture search request, or in a case that the response to the search request is interrupted, the high-dimensional OCR processing may be performed within these time periods, so as to complete the high-dimensional OCR processing of each picture in the preset picture library. As a result, in subsequent picture search tasks, the pictures may be searched based on the high-dimensional OCR result with higher accuracy.

It is to be understood that the unprocessed pictures are pictures which are not subjected to the high-dimensional OCR processing, that is, the unprocessed pictures include not only the pictures which are not subjected to the low-dimensional OCR processing and the high-dimensional OCR processing, but also the pictures which are subjected to the low-dimensional OCR processing and are not subjected to the high-dimensional OCR processing.

S702: Perform the high-dimensional OCR processing on each of the unprocessed pictures to obtain a high-dimensional OCR result of each of the unprocessed pictures.

In some example embodiments, an electronic device stores the low-dimensional OCR result in a preset storage unit after performing low-dimensional OCR processing on each of the traversed pictures to obtain a low-dimensional OCR result of each corresponding picture; and the electronic device stores the high-dimensional OCR result in the preset storage unit, and deletes the low-dimensional OCR result corresponding to the unprocessed picture after performing the high-dimensional OCR processing on each of the unprocessed pictures to obtain a high-dimensional OCR result of each of the unprocessed pictures.

In this example embodiment of the disclosure, after each low-dimensional OCR processing or high-dimensional OCR processing, an electronic device stores the obtained low-dimensional OCR result or high-dimensional OCR result in the preset storage unit. As a result, when a picture search task is performed subsequently, a low-dimensional OCR result or a high-dimensional OCR result may be quickly obtained directly from the preset storage unit, and the key character string may be quickly matched according to the obtained low-dimensional OCR result or high-dimensional OCR result without performing the low-dimensional OCR processing or the high-dimensional OCR processing on the picture, thereby improving the picture search efficiency.

In some example embodiments. S702 may be implemented by S7021 and S7022, and operations are respectively described below.

S7021: Perform text clearing processing on the unprocessed picture to obtain a picture after the text clearing processing.

Here, the text clearing processing includes the following operations: first, segment the unprocessed picture to form at least two sub-pictures; and then, magnify each of the sub-pictures to obtain a magnified sub-picture.

In this example embodiment of the disclosure, an electronic device may equally divide the unprocessed picture into at least two sub-pictures, or may segment the unprocessed picture into at least two irregular or unequal sub-pictures by adopting any segmentation mode, or based on certain segmentation rules.

When irregular or unequal segmentation is performed on an unprocessed picture, for example, the left ⅓ of an unprocessed picture A is a pure picture without any text, while the right ⅔ is a text picture formed by texts, the unprocessed picture A may be divided into two parts, where the first part is a sub-picture formed by the pure picture of the left ⅓, and the second part is a sub-picture formed by the text picture of the right ⅔. In this way, since the first part is the pure picture, OCR is not needed; and the second part is the text picture, so the division cannot affect the continuity of the texts of the second part, the texts of the second part may be recognized more accurately, and OCR only needs to be performed on the second part. As a result, the recognition accuracy is improved, and the recognition efficiency can also be effectively improved.

In this example embodiment of the disclosure, since the high-dimensional OCR result needs to recognize the detailed contents in the picture, and the detailed contents in the picture, such as texts, are usually relatively small, in order to improve the recognition accuracy, the segmented sub-picture may be magnified to reduce the recognition difficulty of the detailed contents.

S7022: Perform OCR on the texts in the picture after the text clearing processing to obtain a high-dimensional OCR result of each of the unprocessed pictures.

Here, OCR on the texts in the picture after the text clearing processing by an electronic device in S7022 may be implemented by the following operations: perform OCR on the texts in the magnified sub-picture to obtain a sub-recognition result corresponding to each of the sub-pictures; and then fuse the sub-recognition result of each sub-picture in at least two sub-pictures to obtain a high-dimensional OCR result of the unprocessed picture.

Here, an electronic device can judge whether at least two sub-recognition results corresponding to the at least two sub-pictures have overlapping contents. Non-overlapping contents and overlapping contents in the at least two sub-recognition results are determined in a case that the at least two sub-recognition results include overlapping contents, and the non-overlapping contents and the overlapping contents are fused to obtain a high-dimensional OCR result of the unprocessed picture.

It is to be understood that here, the fusion of the non-overlapping contents and the overlapping contents refers to deletion of the repeated parts of the overlapping contents in the high-dimensional OCR result. For example, if the sub-recognition result of the first sub-picture includes four keywords A. B. C and D, and the sub-recognition result of the second sub-picture includes four keywords C, D, E and F, at this time, the non-overlapping contents of the sub-recognition result of the first sub-picture and the sub-recognition result of the second sub-picture are: A, B, E and F, and the overlapping contents are C and D, therefore, the high-dimensional OCR result of the unprocessed picture, obtained by fusing the non-overlapping contents and the overlapping contents, includes A, B, C, D, E and F instead of A, B, C, D, C, D, E and F, that is, it is necessary to delete the repeated parts C and D of the overlapping contents C and D in the high-dimensional OCR result.

The segmentation, magnification, OCR and fusion of the sub-recognition results are performed again on each of the sub-pictures in a case that the at least two sub-recognition results do not include the overlapping contents, so as to obtain a recognition result of each of the sub-pictures; and the high-dimensional OCR result of the unprocessed picture is determined according to the recognition result of each of the sub-pictures.

Here, if the at least two sub-recognition results do not include the overlapping contents, in order to further improve the recognition accuracy, an electronic device can perform the segmentation, magnification, recognition and fusion of the recognized results again on the sub-pictures, so as to obtain more accurate recognition results of the sub-pictures.

Figure 8:
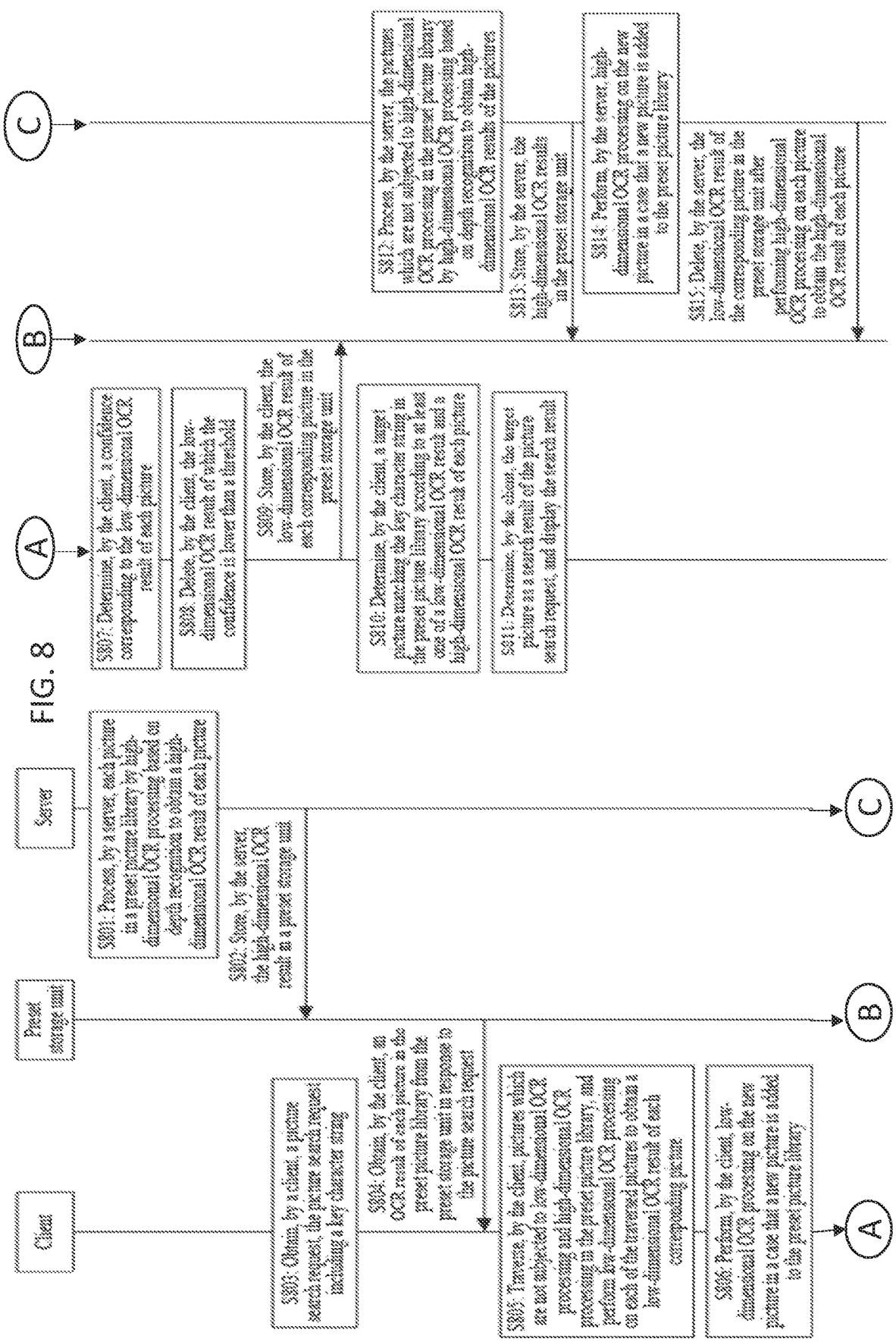
FIG. 8 is an optional schematic flowchart IV of a picture search method according to an example embodiment of the disclosure.

In some example embodiments, a picture search method may be implemented by a client in a picture search system, a preset storage unit corresponding to the client, and a server. FIG. 8 is an optional schematic flowchart IV of a picture search method provided by an example embodiment of the disclosure. As shown in FIG. 8, the picture search method includes S801 to S815, and operations are respectively described below.

S801: Process, by the server, each picture in a preset picture library by high-dimensional OCR processing based on depth recognition to obtain a high-dimensional OCR result of each picture.

Here, the server performs the high-dimensional OCR processing on each picture in the preset picture library during an idle time, which can effectively utilize resources, and avoid the problem of reduction of the search efficiency by performing the high-dimensional OCR processing during a picture search task.

S802: Store, by the server, the high-dimensional OCR result in a preset storage unit.

In this example embodiment of the disclosure, when the server obtains a high-dimensional OCR result of a picture after processing, the high-dimensional OCR result is stored in the preset storage unit, so as to ensure that the high-dimensional OCR result may be used in time in subsequent picture search tasks.

S803: Obtain, by the client, a picture search request, the picture search request including a key character string.

S804: Obtain, by the client, an OCR result of each picture in the preset picture library from the preset storage unit in response to the picture search request.

The OCR result includes at least one of the following: a low-dimensional OCR result obtained by low-dimensional OCR processing based on an OCR threshold and a high-dimensional OCR result obtained by high-dimensional OCR processing based on depth recognition, and the recognition accuracy of the low-dimensional OCR processing is lower than the recognition accuracy of the high-dimensional OCR processing.

S805: Traverse, by the client, pictures which are not subjected to the low-dimensional OCR processing and the high-dimensional OCR processing in the preset picture library, and perform the low-dimensional OCR processing on each of the traversed pictures to obtain a low-dimensional OCR result of each corresponding picture.

S806: Perform, by the client, the low-dimensional OCR processing on the new picture in a case that a new picture is added to the preset picture library.

In this example embodiment of the disclosure, if a new picture is added to the preset picture library, the low-dimensional OCR processing needs to be performed on the new picture, so as to ensure that each picture in the preset picture library has a low-dimensional OCR result. Alternatively, if a new picture is added to the preset picture library, the low-dimensional OCR processing needs to be performed on the new picture in time in the next picture search task.

S807: Determine, by the client, a confidence corresponding to the low-dimensional OCR result of each picture.

In this example embodiment of the disclosure, a specific OCR model may be used for OCR. When the OCR model is used for OCR, a low-dimensional OCR result may be obtained, and a confidence corresponding to the low-dimensional OCR result can also be obtained.

Influence factors of the confidence include, but are not limited to, at least one of the following: a clarity of a picture, a type of the picture, the number of texts recognized, etc. For example, for a relatively blurred picture with a relatively low clarity, the confidence of the recognition result will be relatively low; there is also a difference in the confidence of recognition of printed characters and handwritten characters. Compared with the printed characters, the confidence of the recognition result of the handwritten characters is relatively low; and when the same picture is recognized, if the number of texts recognized is much smaller than the actual number of texts, the confidence of the recognition result is relatively low.

S808: Delete, by the client, the low-dimensional OCR result of which the confidence is lower than the threshold.

In this example embodiment of the disclosure, a low-dimensional OCR result with a high confidence is selected.

S809: Store, by the client, the low-dimensional OCR result of each corresponding picture in the preset storage unit.

S810: Determine, by the client, a target picture matching the key character string in the preset picture library according to at least one of the low-dimensional OCR result and the high-dimensional OCR result of each picture.

S811: Determine, by the client, the target picture as a search result of the picture search request, and display the search result.

S812: Process, by the server, the pictures which are not subjected to high-dimensional OCR processing in the preset picture library by high-dimensional OCR processing based on depth recognition to obtain high-dimensional OCR results of the pictures.

Here, since the pictures in the preset picture library are not subjected to the high-dimensional OCR processing completely, during an idle time after completing a picture search task, a background server can continue to process the pictures which are not subjected to high-dimensional OCR processing in the preset picture library by the high-dimensional OCR processing based on depth recognition.

S813: Store, by the server, the high-dimensional OCR result in the preset storage unit.

S814: Perform, by the server, high-dimensional OCR processing on the new picture in a case that a new picture is added to the preset picture library.

In this example embodiment of the disclosure, if a new picture is added to the preset picture library, the high-dimensional OCR processing needs to be performed on the new picture, so as to ensure that each picture in the preset picture library has a high-dimensional OCR result.

S815: Delete, by the server, the low-dimensional OCR result of the corresponding picture in the preset storage unit after performing high-dimensional OCR processing on each picture to obtain the high-dimensional OCR result of each picture.

In this example embodiment of the disclosure, since the recognition accuracy of the high-dimensional OCR result is higher than the recognition accuracy of the low-dimensional OCR result, if any picture has both a low-dimensional OCR result and a high-dimensional OCR result, only the high-dimensional OCR result with higher recognition accuracy may be retained, and the low-dimensional OCR result stored in the preset storage unit may be deleted. In this way, the storage space in the preset storage unit may be saved; and during subsequent picture search tasks, the high-dimensional OCR results stored in the preset storage unit may be directly used for matching the key character string, and there is no need to determine high-dimensional OCR results with higher recognition accuracy from low-dimensional OCR results and high-dimensional OCR results, so that a operation of interpretation and selection is saved, and the search efficiency is further improved.

The following describes an exemplary application of this example embodiment of the disclosure in an actual application scenario. This exemplary application describes a process of accurately and quickly searching for a target picture matching search keywords in the album based on the obtained search keywords input by a user if a preset picture library is an album.

An example embodiment of the disclosure provides a picture search method. In an actual product application, a user only needs to input search keywords on an input interface of a picture search application, then the picture search application can automatically search for a search result matching the search keywords, and the search result may accurately include the texts in a picture. The method provided by this example embodiment of the disclosure may be applicable to all picture search scenes.

Figure 9:
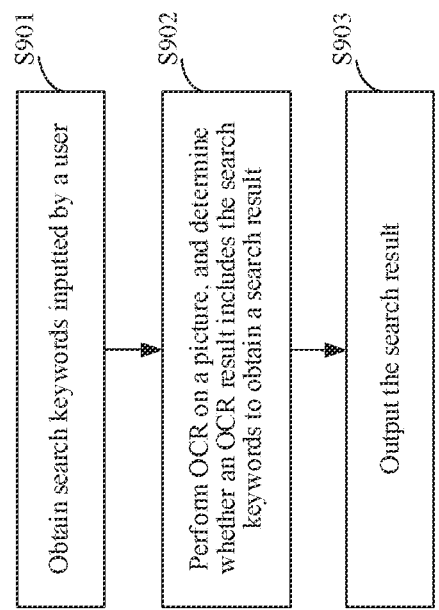
FIG. 9 is a schematic flowchart of a picture search method according to an example embodiment of the disclosure.

FIG. 9 is a schematic flowchart of a picture search method provided by an example embodiment of the disclosure. As shown in FIG. 9, the picture search method is implemented by a client, including S901 to S903, and operations are respectively described below.

S901: Obtain search keywords (called key character string) inputted by a user.

S902: Perform OCR on a picture, and determine whether an OCR result includes the search keywords to obtain a search result (called target picture).

S903: Output the search result.

Since OCR takes a certain time, the efficiency of the OCR needs to be high during searching by a user. Therefore, the overall search process is based on the combination of recognition during an idle time in the background and fast recognition during searching, which ensures the accuracy and integrity of the OCR on a picture while ensuring the fast output of the search result. In this example embodiment of the disclosure, the picture search method may be implemented by combining a simplified recognition strategy with a depth recognition strategy, where the simplified recognition strategy corresponds to the low-dimensional OCR processing in this example embodiment of the disclosure, and the depth recognition strategy corresponds to the high-dimensional OCR processing in this example embodiment of the disclosure. Detailed processes of the simplified recognition strategy and the depth recognition strategy and a scheduling relationship between the simplified recognition strategy and the depth recognition strategy are described in detail below.

Figure 10:
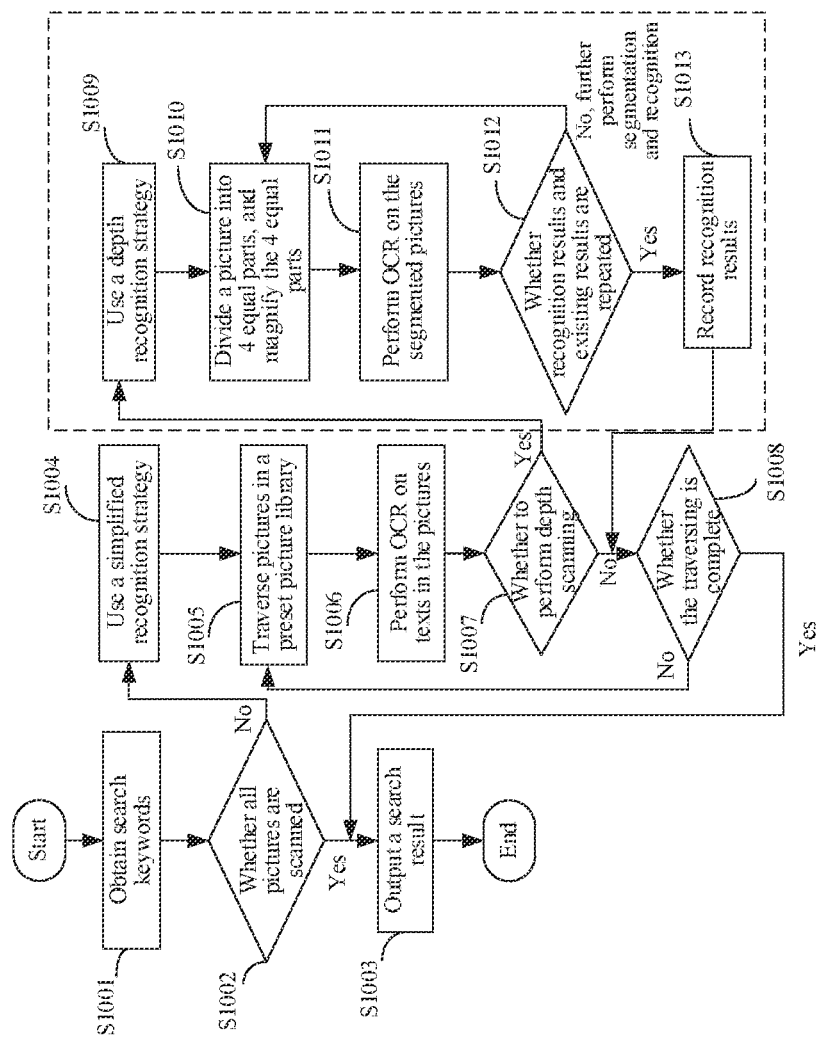
FIG. 10 is a detailed schematic flowchart of a picture search method according to an example embodiment of the disclosure.

FIG. 10 is a detailed schematic flowchart of a picture search method provided by an example embodiment of the disclosure. As shown in FIG. 10, the picture search method includes S1001 to S1013, and operations are respectively described below.

S1001: Obtain search keywords.

It is to be understood that when a client starts to perform picture search, the client obtains the search keywords in response to a user operation.

S1002: Judge whether a picture is scanned completely.

Here, if a simplified recognition of all pictures is already performed on a preset picture library (called complete scanning), the recognition result may be used for querying; and if the simplified recognition of all pictures is not completed for the preset picture library, a simplified recognition process is performed. In other words, if a judging result is yes, the recognition result is used for querying, and S1003 is performed; and if a judging result is no, S1004 is performed.

S1003: Output a search result.

In this example embodiment of the disclosure, when the contents recognized by OCR are used for searching, if a full simplified recognition is performed on the preset picture library, a recognition result may be searched by using the search keywords, and a search result including the search keywords may be outputted at the same time to complete the search.

S1004; Use the simplified recognition strategy (called low-dimensional OCR processing).

S1005: Traverse pictures in the preset picture library.

S1006: Perform OCR on texts in the pictures.

It is to be understood that the pictures here are pictures which are not subjected to low-dimensional OCR processing and high-dimensional OCR processing.

S1007: Judge whether to perform depth scanning (that is, whether to use the depth recognition strategy to perform depth recognition during an idle time in the background).

If a judging result is yes, S1009 is performed for depth scanning; and if a judging result is no, S1008 is performed.

S1008: Judge whether the traversing is complete.

If a judging result is yes, S1003 is performed; and if a judging result is no. S1005 is performed.

When it is determined to use the depth recognition strategy for processing, the depth recognition strategy includes S1009 to S1013, and operations are respectively described below.

S1009: Use the depth recognition strategy (called high-dimensional OCR processing).

S1010: Divide a picture into 4 equal parts, and magnify the 4 equal parts.

S1011: Perform OCR on the segmented pictures (called sub-pictures).

S1012: Judge whether recognition results (called sub-recognition results) and existing results (called sub-recognition results) are repeated.

Here, the existing results refer to results obtained by recognizing other equal parts of the picture in a historical process when any equal part (called sub-picture) in any picture is recognized currently.

In this example embodiment of the disclosure, whether the result obtained by recognizing any equal part in any picture currently and the results obtained by recognizing other equal parts of the picture in the historical process have overlapping contents is judged. If a judging result is yes, S1013 is performed; and if a judging result is no, S1010 is performed to continue segmentation and recognition.

S1013: Record recognition results.

A simplified recognition process is described in detail below.

Figure 11:
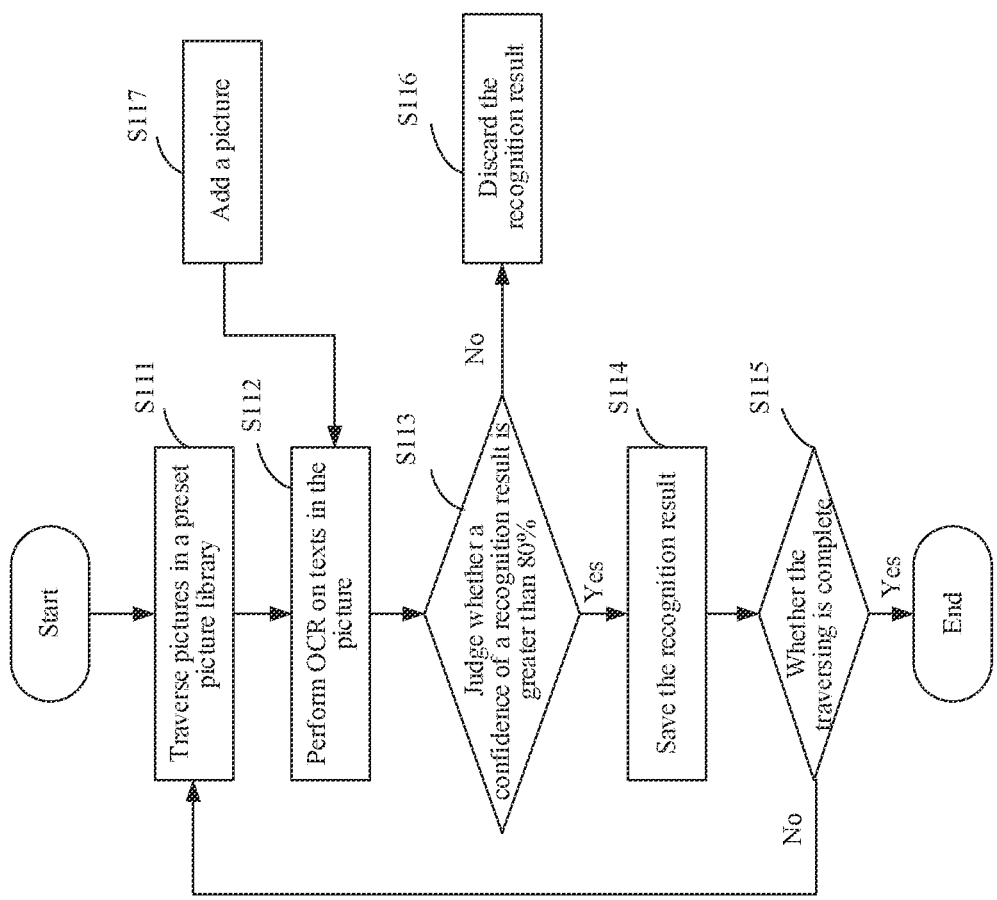
FIG. 11 is a schematic flowchart of a simplified recognition process according to an example embodiment of the disclosure.
Figure 12:
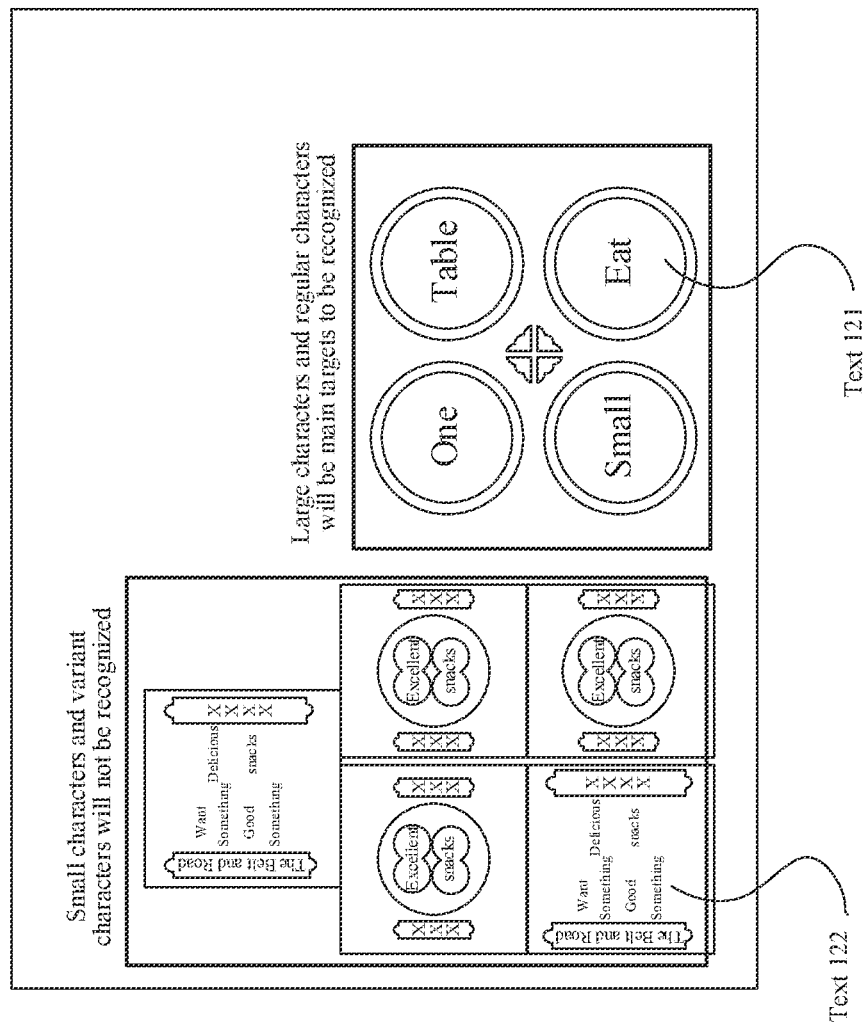
FIG. 12 is a schematic diagram of a simplified recognition process according to an example embodiment of the disclosure.

FIG. 11 is a schematic flowchart of a simplified recognition process provided by an example embodiment of the disclosure. As shown in FIG. 11, in the simplified recognition process, OCR is used for simply recognizing texts on a picture. FIG. 12 is a schematic diagram of a simplified recognition process provided by an example embodiment of the disclosure. In the simplified recognition process, large characters and regular characters, such as the text 121 in FIG. 12, are targets to be actively recognized. However, the recognition of small characters, variant characters, etc., such as the text 122 in FIG. 12, requires more time and resources, therefore, this type of font will not be recognized, so as to ensure that the recognition time of a single picture may be controlled within 10 milliseconds.

Please continue to refer to FIG. 11, the process of the simplified recognition strategy includes S111 to S117, and operations are respectively described below.

S111: Traverse pictures in a preset picture library.

When the simplified recognition strategy is performed, a client traverses pictures in the preset picture library to obtain pictures which are not subjected to low-dimensional OCR processing and high-dimensional OCR processing.

S112: Perform OCR on texts in the pictures.

It is to be understood that the pictures here are pictures which are not subjected to low-dimensional OCR processing and high-dimensional OCR processing.

S113: Judge whether a confidence of a recognition result is greater than 80%.

Here, a recognition result with a high confidence is selected. In the simplified recognition process, results with low confidences are excluded. Because the time when the simplified recognition is triggered is when a user is searching and depth recognition is not completed, it is necessary to maintain certain recognition accuracy so as to ensure that the user can search normally, and avoid excessive search interference items due to a low confidence.

In this example embodiment of the disclosure, the confidence is a value that may be obtained during OCR, that is, during OCR on a picture, a recognition result is outputted, and a confidence corresponding to the recognition result is also outputted.

In S113, if a judging result is yes, S114 is performed; and if a judging result is no, S116 is performed.

S114: Save recognition results.

In this example embodiment of the disclosure, after all pictures are recognized, OCR results corresponding to the pictures will be saved in a database.

S115: Judge whether the traversing is complete.

If a judging result is yes, the process is ended; and if a judging result is no, S111 is performed.

S116: Discard recognition results.

S117: Add a picture.

It is to be understood that if a picture is added, S112 is performed for OCR on texts in the added picture.

In this example embodiment of the disclosure, if a new picture is added, a full recognition is not needed, it is only necessary to perform a recognition on the added picture, and a recognition result is saved in the database (called preset storage unit).

The depth recognition strategy is described in detail below.

Figure 13:
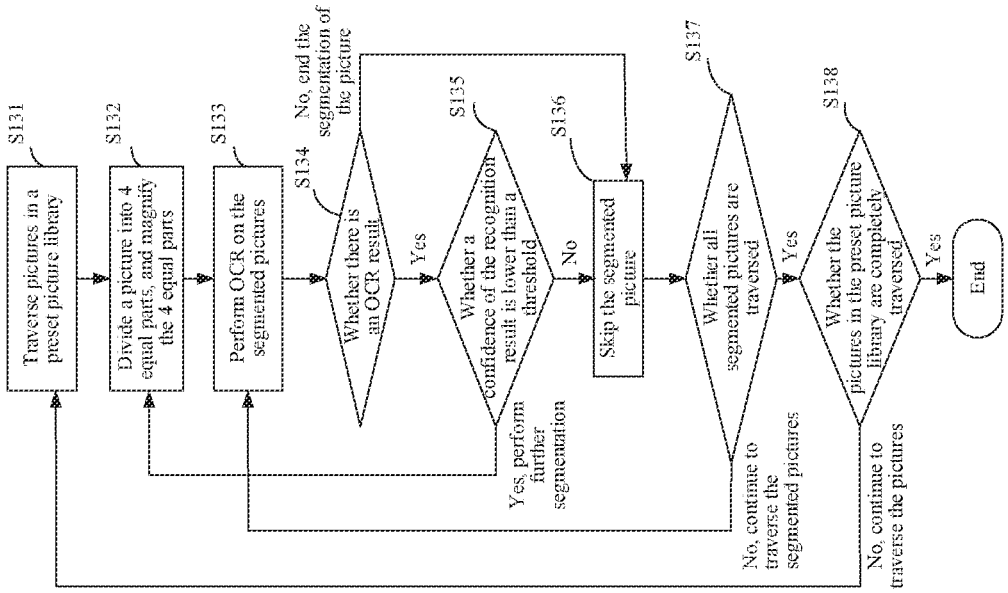
FIG. 13 is a schematic flowchart of a depth recognition strategy according to an example embodiment of the disclosure.

FIG. 13 is a schematic flowchart of a depth recognition strategy provided by an example embodiment of the disclosure. As shown in FIG. 13, the depth recognition strategy includes S131 to S138, and operations are respectively described below.

S131: Traverse pictures in a preset picture library.

It is to be understood that in this example embodiment of the disclosure, the depth recognition will be performed during an idle time (for example, late at night, during charging, and when an application is not in use).

S132: Divide a picture into 4 equal parts, and magnify the 4 equal parts.

During depth recognition, a picture is segmented and magnified to ensure that more information may be recognized. For example, during depth recognition, a picture may be divided into four equal parts. The purpose of this processing is to recognize more texts in the picture. FIG. 14A is a schematic diagram before equally dividing and magnifying a picture provided by an example embodiment of the disclosure. FIG. 14B is a schematic diagram after equally dividing and magnifying a picture provided by an example embodiment of the disclosure. As shown in FIG. 14A and FIG. 14B, in an original picture area 141 before equally dividing and magnifying a picture, texts are relatively small and thus are difficult to recognize; and in a partially magnified picture area 142 after equally dividing and magnifying a picture, texts are magnified and thus are easy to recognize, where the picture area 142 is a magnified result of the picture area 141.

In this example embodiment of the disclosure, segmented pictures are recognized. If a segmented picture does not include any text information, the segmented picture will be discarded, and the area of the segmented picture will not be recognized.

S133: Perform OCR on the segmented pictures.

S134: Judge whether there is an OCR result.

If a judging result is yes, S135 is performed, and if a judging result is no, the segmentation of the picture is ended, and S136 is performed.

S135: Judge whether a confidence of the recognition result is lower than the threshold.

In this example embodiment of the disclosure, segmentation and recognition may be performed again according to the result with a low confidence.

In this example embodiment of the disclosure, after a picture is divided into four equal parts, the picture may still include excessive text information (such as a panoramic picture and a long screenshot), so a confidence of a recognition result is relatively low. For this part of the picture, the segmented picture is segmented again, and the secondarily segmented picture is also recognized. If contents with a high confidence (e.g. greater than 70%) may be recognized from the picture, or the picture does not include text information, no further segmentation is needed.

In S135, if a judging result is yes, S132 is performed for further segmenting and recognizing the picture; and if a judging result is no, S136 is performed.

S136: Skip the segmented picture.

S137; Judge whether all segmented pictures are traversed.

If a judging result is yes, S138 is performed; and if a judging result is no, the segmented pictures are further traversed, and S133 is performed.

S138: Judge whether the pictures in the preset picture library are completely traversed.

If a judging result is yes, the process is ended; and if a judging result is no, S131 is performed for further traversing the pictures.

In this example embodiment of the disclosure, a recognition result may be saved in a database. If the database includes a result of a simplified recognition process of the picture, the result of the simplified recognition process is replaced with a result of depth recognition. Similarly, if a new picture is added, incremental recognition may be performed directly on the new picture, that is, depth recognition is performed on the new picture.

The picture search method provided by the example embodiments of the disclosure can more accurately search for text information in photos when searching for photos, and provide more dimensions of photo search. The picture search method may be applicable to more search scenes, such as note search and chat record screenshot search, has higher accuracy without the need for background cloud recognition, and may be used offline.

The following describes an exemplary structure of the picture search apparatus 354 provided by an example embodiment of the disclosure implemented as a software module. In some example embodiments, as shown in FIG. 3, the picture search apparatus 354 stored in the memory 350 includes:

- an obtaining module 3541 configured to obtain a picture search request, the picture search request including a key character string:
- a response module 3542 configured to obtain an OCR result of each picture in a preset picture library in response to the picture search request, the OCR result including at least one of the following: a low-dimensional OCR result obtained by low-dimensional OCR processing based on an OCR threshold and a high-dimensional OCR result obtained by high-dimensional OCR processing based on depth recognition, and the recognition accuracy of the low-dimensional OCR processing being lower than the recognition accuracy of the high-dimensional OCR processing;
- a processing module 3543 configured to traverse pictures which are not subjected to the low-dimensional OCR processing and the high-dimensional OCR processing in the preset picture library, and perform the low-dimensional OCR processing on each of the traversed pictures to obtain a low-dimensional OCR result of each corresponding picture;
- a first determining module 3544 configured to determine a target picture matching the key character string in the preset picture library according to at least one of the low-dimensional OCR result and the high-dimensional OCR result of each picture; and
- a second determining module 3545 configured to determine the target picture as a search result of the picture search request, and display the search result.

In some example embodiments, the processing module 3543 is further configured to: traverse pictures which are not subjected to the low-dimensional OCR processing and the high-dimensional OCR processing in a case that it is determined that at least one picture in the preset picture library is not subjected to the low-dimensional OCR processing and the high-dimensional OCR processing, and perform the low-dimensional OCR processing on each of the traversed pictures.

In some example embodiments, an OCR threshold includes a recognition speed threshold, and the processing module 3543 is further configured to: determine a recognition speed for each text in the traversed picture; and perform OCR on the text of which the recognition speed is greater than the recognition speed threshold, the OCR being used for performing the low-dimensional OCR processing on the picture.

In some example embodiments, an OCR threshold includes a font size threshold, and the processing module 3543 is further configured to: determine a font size of each text in the traversed picture, and perform OCR on the text of which the font size is greater than the font size threshold, the OCR being used for performing the low-dimensional OCR processing on the picture.

In some example embodiments, the processing module 3543 is further configured to: end the process of performing the low-dimensional OCR processing on the variant character in a case that the traversed picture includes a variant character.

In some example embodiments, the first determining module 3544 is further configured to: determine the high-dimensional OCR result as the OCR result of the picture in a case that the picture has both a low-dimensional OCR result and a high-dimensional OCR result; determine the low-dimensional OCR result as the OCR result of the picture in a case that the picture only has a low-dimensional OCR result; and determine the target picture matching the key character string in the preset picture library according to the OCR result of the picture.

In some example embodiments, the picture search apparatus 354 further includes: a third determining module configured to determine the pictures which are not subjected to the high-dimensional OCR processing in the preset picture library as unprocessed pictures before obtaining the picture search request, or after completing the response to the picture search request, or in a case that the response to the picture search request is interrupted; and perform the high-dimensional OCR processing on each of the unprocessed pictures to obtain the high-dimensional OCR result of each of the unprocessed pictures.

In some example embodiments, the picture processing module is further configured to: perform text clearing processing on the unprocessed picture to obtain a picture after the text clearing processing; and perform OCR on the texts in the picture after the text clearing processing to obtain the high-dimensional OCR result of each of the unprocessed pictures.

In some example embodiments, the picture processing module is further configured to: segment the unprocessed picture to obtain at least two sub-pictures; magnify each of the sub-pictures to obtain a magnified sub-picture; perform OCR on the texts in the magnified sub-picture to obtain a sub-recognition result corresponding to each of the sub-pictures; and fuse the at least two sub-recognition results corresponding to the at least two sub-pictures to obtain the high-dimensional OCR result of the unprocessed picture.

In some example embodiments, the picture processing module is further configured to: determine non-overlapping contents and the overlapping contents in the at least two sub-recognition results in a case that the at least two sub-recognition results corresponding to the at least two sub-pictures include overlapping contents, fuse the non-overlapping contents and the overlapping contents to obtain the high-dimensional OCR result of the unprocessed picture; perform the segmentation, magnification, OCR and fusion of the sub-recognition results again on each of the sub-pictures in a case that the at least two sub-recognition results corresponding to the at least two sub-pictures do not include the overlapping contents, so as to obtain a recognition result of each of the sub-pictures; and determine the high-dimensional OCR result of the unprocessed picture according to the recognition result of each of the sub-pictures.

In some example embodiments, the picture search apparatus 354 further includes: a storage module configured to store the low-dimensional OCR result in a preset storage unit after performing the low-dimensional OCR processing on each of the traversed pictures to obtain a low-dimensional OCR result of each corresponding picture; and store the high-dimensional OCR result in the preset storage unit, and delete the low-dimensional OCR result corresponding to the unprocessed picture after performing the high-dimensional OCR processing on each of the unprocessed pictures to obtain the high-dimensional OCR result of each of the unprocessed pictures.

In some example embodiments, the picture search apparatus 354 further includes: a fourth determining module configured to determine a confidence corresponding to the low-dimensional OCR result of each of the pictures; and a deletion module configured to delete the low-dimensional OCR result of which the confidence is lower than the threshold.

In some example embodiments, the picture search apparatus 354 further includes, an OCR processing module configured to perform the low-dimensional OCR processing or the high-dimensional OCR processing on the new picture in a case that a new picture is added to the preset picture library.

The description of the picture search apparatus provided by the example embodiments of the disclosure is similar to the description of the picture search method provided by the example embodiments of the disclosure, and has similar beneficial effects.

An example embodiment of the disclosure provides a computer program product or a computer program. The computer program product or the computer program includes computer instructions, and the computer instructions are stored in a computer-readable storage medium. A processor of a computer device (an electronic device configured to search a picture) reads the computer instructions from the computer-readable storage medium, and executes the computer instructions, to cause the computer device to perform the picture search method provided in the foregoing example embodiments of the disclosure.

An example embodiment of the disclosure provides a computer-readable storage medium, storing executable instructions. The executable instructions, when executed by a processor, cause the processor to perform the picture search method in the example embodiments of the disclosure, for example, the picture search method shown in FIG. 4.

In some example embodiments, the computer-readable storage medium may be a memory, such as a ferromagnetic random access memory (FRAM), a read only memory (ROM), a programmable read-only memory (PROM), an erasable programmable read-only memory (EPROM), an electrically erasable programmable read-only memory (EEPROM), a flash memory, a magnetic surface memory, an optic disc, or a compact disc read-only memory (CD-ROM); and may also be any device including one of or any combination of the foregoing memories.

In some example embodiments, the executable instructions may be written in any form of programming language (including a compiled or interpreted language, or a declarative or procedural language) by using the form of a program, software, a software module, a script or code, and may be deployed in any form, including being deployed as an independent program or being deployed as a module, a component, a subroutine, or another unit suitable for use in a computing environment.

In an example embodiment, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts). In an example embodiment, the executable instructions may be deployed to be executed on a computing device, or deployed to be executed on a plurality of computing devices at the same location, or deployed to be executed on a plurality of computing devices that are distributed in a plurality of locations and interconnected by using a communication network.

The foregoing descriptions are merely example embodiments of the disclosure and are not intended to limit the protection scope of the disclosure. Any modification, equivalent replacement, or improvement made without departing from the spirit and range of the disclosure shall fall within the protection scope of the disclosure.

What is claimed is:

1. A picture search method, performed by an electronic device, comprising:
   obtaining a picture search request comprising a key character string;
   obtaining an optical character recognition (OCR) result of pictures in a preset picture library in response to the picture search request, the OCR result comprising at least one of the following:
      a low-dimensional OCR result obtained by low-dimensional OCR processing based on an OCR threshold, wherein the OCR threshold comprises a recognition speed threshold, or
      a high-dimensional OCR result obtained by high-dimensional OCR processing based on depth recognition, a recognition accuracy of the low-dimensional OCR processing being lower than a recognition accuracy of the high-dimensional OCR processing;
   traversing pictures which are not subjected to the low-dimensional OCR processing and the high-dimensional OCR processing in the preset picture library;
   performing the low-dimensional OCR processing on the traversed pictures to obtain a low-dimensional OCR result of each corresponding picture, wherein the performing the low-dimensional OCR processing on the traversed pictures comprises:
      determining a recognition speed for each text in each of the traversed pictures; and
      performing OCR on the text of which the recognition speed is greater than the recognition speed threshold, the OCR being used for performing the low-dimensional OCR processing on the picture;
   determining a target picture matching the key character string in the preset picture library according to at least one of the low-dimensional OCR result and the high-dimensional OCR result of each picture;
determining the target picture as a search result of the picture search request; and
displaying the search result.

2. The method according to claim 1, wherein the traversing comprises:
traversing pictures which are not subjected to the low-dimensional OCR processing and the high-dimensional OCR processing based on determining that at least one picture in the preset picture library is not subjected to the low-dimensional OCR processing and the high-dimensional OCR processing, and performing the low-dimensional OCR processing on each of the traversed pictures.

3. The method according to claim 1, wherein the OCR threshold comprises a font size threshold, and the performing the low-dimensional OCR processing on the traversed pictures comprises:
determining a font size of each text in each of the traversed pictures; and
performing OCR on the text of which the font size is greater than the font size threshold, the OCR being used for performing the low-dimensional OCR processing on the picture.

4. The method according to claim 1, wherein before performing the low-dimensional OCR processing on the traversed pictures, the method further comprises:
ending the process of performing the low-dimensional OCR processing on a variant character in one of the traversed pictures.

5. The method according to claim 1, wherein the determining the target picture matching the key character string comprises:
determining the high-dimensional OCR result as the OCR result of the target picture if the target picture has both a low-dimensional OCR result and a high-dimensional OCR result; and
determining the low-dimensional OCR result as the OCR result of the target picture if the target picture only has a low-dimensional OCR result.

6. The method according to claim 1, further comprising:
determining pictures which are not subjected to the high-dimensional OCR processing in the preset picture library as unprocessed pictures before obtaining the picture search request, after completing the response to the picture search request, or in a case that the response to the picture search request is interrupted; and
performing the high-dimensional OCR processing on the unprocessed pictures to obtain the high-dimensional OCR result of each of the unprocessed pictures.

7. The method according to claim 6, wherein the performing the high-dimensional OCR processing on the unprocessed pictures comprises:
performing text clearing processing on the unprocessed picture to obtain a picture; and
performing OCR on the texts in the picture after the text clearing processing to obtain the high-dimensional OCR result of each of the unprocessed pictures.

8. The method according to claim 7, wherein the performing text clearing processing comprises:
segmenting each of the unprocessed pictures to obtain at least two sub-pictures; and
magnifying each of the sub-pictures to obtain a magnified sub-picture;
the performing OCR on the texts in the picture after the text clearing processing to obtain the high-dimensional OCR result of each of the unprocessed pictures comprises:
performing OCR on the texts in the magnified sub-picture to obtain a sub-recognition result corresponding to each of the at least two sub-pictures; and
fusing the at least two sub-recognition results corresponding to the at least two sub-pictures to obtain the high-dimensional OCR result of the unprocessed picture.

9. The method according to claim 8, wherein the fusing the at least two sub-recognition results comprises:
determining non-overlapping contents and overlapping contents in the at least two sub-recognition results;
fusing the non-overlapping contents and the overlapping contents to obtain the high-dimensional OCR result of the unprocessed picture;
performing the segmentation, magnification, OCR and fusion of the at least two sub-recognition results again on each of the sub-pictures if the at least two sub-recognition results do not comprise the overlapping contents, so as to obtain a recognition result of each of the sub-pictures; and
determining the high-dimensional OCR result of the unprocessed picture according to the recognition result of each of the sub-pictures.

10. The method according to claim 6, further comprising:
storing a low-dimensional OCR result in a preset storage unit after performing the low-dimensional OCR processing on each of the traversed pictures; and
storing a high-dimensional OCR result in the preset storage unit, and deleting the low-dimensional OCR result corresponding to the unprocessed picture after performing the high-dimensional OCR processing on each of the unprocessed pictures.

11. The method according to claim 1, further comprising:
performing the low-dimensional OCR processing or the high-dimensional OCR processing on a new picture when the new picture is added to the preset picture library.

12. A picture search apparatus, comprising:
one or more processors; and
memory storing instructions, when executed by the one or more processors, cause the picture search apparatus to:
obtain a picture search request comprising a key character string;
obtain an optical character recognition (OCR) result of pictures in a preset picture library in response to the picture search request, the OCR result comprising at least one of the following:
a low-dimensional OCR result obtained by low-dimensional OCR processing based on an OCR threshold, wherein the OCR threshold comprises a recognition speed threshold, or
a high-dimensional OCR result obtained by high-dimensional OCR processing based on depth recognition, a recognition accuracy of the low-dimensional OCR processing being lower than a recognition accuracy of the high-dimensional OCR processing;
traverse pictures which are not subjected to the low-dimensional OCR processing and the high-dimensional OCR processing in the preset picture library;
perform the low-dimensional OCR processing on each of the traversed pictures to obtain a low-dimensional OCR result of each corresponding picture, wherein performing the low-dimensional OCR processing on the traversed pictures comprises:
  determining a recognition speed for each text in each of the traversed pictures; and
  performing OCR on the text of which the recognition speed is greater than the recognition speed threshold, the OCR being used for performing the low-dimensional OCR processing on the picture;
determine a target picture matching the key character string in the preset picture library according to at least one of the low-dimensional OCR result and the high-dimensional OCR result of each picture; determine the target picture as a search result of the picture search request; and
display the search result.

13. A non-transitory computer-readable storage medium storing instructions, when executed, cause:
  obtaining a picture search request comprising a key character string;
  obtaining an optical character recognition (OCR) result of pictures in a preset picture library in response to the picture search request, the OCR result comprising at least one of the following:
    a low-dimensional OCR result obtained by low-dimensional OCR processing based on an OCR threshold, wherein the OCR threshold comprises a recognition speed threshold, or
    a high-dimensional OCR result obtained by high-dimensional OCR processing based on depth recognition, a recognition accuracy of the low-dimensional OCR processing being lower than a recognition accuracy of the high-dimensional OCR processing;
  traversing pictures which are not subjected to the low-dimensional OCR processing and the high-dimensional OCR processing in the preset picture library;
  performing the low-dimensional OCR processing on each of the traversed pictures to obtain a low-dimensional OCR result of each corresponding picture, wherein the performing the low-dimensional OCR processing on the traversed pictures comprises:
    determining a recognition speed for each text in each of the traversed pictures; and
    performing OCR on the text of which the recognition speed is greater than the recognition speed threshold, the OCR being used for performing the low-dimensional OCR processing on the picture;
  determining a target picture matching the key character string in the preset picture library according to at least one of the low-dimensional OCR result and the high-dimensional OCR result of each picture;
  determining the target picture as a search result of the picture search request; and
  displaying the search result.

14. The non-transitory computer-readable storage medium according to claim 13, wherein the traversing comprises:
  traversing pictures which are not subjected to the low-dimensional OCR processing and the high-dimensional OCR processing based on determining that at least one picture in the preset picture library is not subjected to the low-dimensional OCR processing and the high-dimensional OCR processing, and performing the low-dimensional OCR processing on each of the traversed pictures.

15. The non-transitory computer-readable storage medium according to claim 13, wherein the OCR threshold comprises a font size threshold, and the performing the low-dimensional OCR processing on the traversed pictures comprises:
  determining a font size of each text in each of the traversed pictures; and
  performing OCR on the text of which the font size is greater than the font size threshold, the OCR being used for performing the low-dimensional OCR processing on the picture.

16. The non-transitory computer-readable storage medium according to claim 13, wherein the instructions, when executed, further cause:
  before performing the low-dimensional OCR processing on the traversed pictures, ending the process of performing the low-dimensional OCR processing on a variant character in one of the traversed pictures.

17. The non-transitory computer-readable storage medium according to claim 13, wherein the determining the target picture matching comprises:
  determining the high-dimensional OCR result as the OCR result of the target picture if the target picture has both a low-dimensional OCR result and a high-dimensional OCR result; and
  determining the low-dimensional OCR result as the OCR result of the target picture if the picture only has a low-dimensional OCR result.

18. The non-transitory computer-readable storage medium according to claim 13, wherein the instructions, when executed, further cause:
  determining pictures which are not subjected to the high-dimensional OCR processing in the preset picture library as unprocessed pictures before obtaining the picture search request, after completing the response to the picture search request, or in a case that the response to the picture search request is interrupted; and
  performing the high-dimensional OCR processing on each of the unprocessed pictures to obtain the high-dimensional OCR result of each of the unprocessed pictures.

* * * * *